(12) United States Patent
Tompkins

(10) Patent No.: US 6,862,616 B1
(45) Date of Patent: Mar. 1, 2005

(54) SYSTEM AND METHOD FOR FACILITATING DISTRIBUTED SERVER ADMINISTRATION OF SERVER SYSTEMS THAT ARE SCALABLE AND VERSION INDEPENDENT

(75) Inventor: David Tompkins, Palo Alto, CA (US)

(73) Assignee: Netscape Communications Corp., Mountain View, CA (US)

(*) Notice: Subject to any disclaimer, the term of this patent is extended or adjusted under 35 U.S.C. 154(b) by 0 days.

(21) Appl. No.: 09/528,844

(22) Filed: Mar. 20, 2000

(51) Int. Cl.[7] .............................................. G06F 15/173
(52) U.S. Cl. ........................ 709/223; 709/217; 709/219; 709/220; 709/224; 717/172; 717/173; 717/177; 717/178
(58) Field of Search .................... 709/217, 223–224, 709/219, 220; 717/172–173, 177–178

(56) References Cited

U.S. PATENT DOCUMENTS

| | | | |
|---|---|---|---|
| 5,727,156 A | 3/1998 | Herr-Hoyman et al. | 709/219 |
| 5,790,793 A | 8/1998 | Higley | 709/218 |
| 5,799,285 A | 8/1998 | Klingman | 705/26 |
| 5,870,559 A | 2/1999 | Leshem et al. | 709/224 |
| 5,870,767 A | 2/1999 | Kraft, IV | 707/501.1 |
| 5,893,127 A | 4/1999 | Tyan et al. | 707/513 |
| 5,905,248 A | 5/1999 | Russell et al. | 235/462.15 |
| 5,913,215 A | 6/1999 | Rubinstein et al. | 707/10 |
| 6,026,437 A * | 2/2000 | Muschett et al. | 709/219 |
| 6,272,537 B1 * | 8/2001 | Kekic et al. | 709/223 |
| 6,272,556 B1 * | 8/2001 | Gish | 709/315 |
| 6,324,578 B1 * | 11/2001 | Cox et al. | 709/223 |
| 6,466,971 B1 * | 10/2002 | Humpleman et al. | 709/220 |

\* cited by examiner

*Primary Examiner*—Dung C. Dinh
*Assistant Examiner*—Kevin Parton
(74) *Attorney, Agent, or Firm*—Arent Fox PLLC

(57) ABSTRACT

System and method for facilitating distributed server administration of network server systems that are scalable and version independent. The system and method include and involve a server and a client administrator. The server is configured to store and to serve a software package that corresponds to a server software system of the server. The server is further configured to be accessed by client administrator via an electronic data network, such as the Internet and World Wide Web (WWW). The client administrator is configured to access the server, to receive the software package, and to process the software package to conform to the specifications of the server. Execution of the software package allows the server to be administered by the client administrator without requiring the client administrator to be pre-configured with knowledge of the server.

6 Claims, 4 Drawing Sheets

```

# Class Loader environment definition file

jdk-version=1.1.6
jfc-version=1.0.2
mcc-version=4.0
include-jar0=mcc40.jar
include-jar1=nmclf40.jar
```

FIG. 2

SYSTEM AND METHOD FOR FACILITATING DISTRIBUTED SERVER ADMINISTRATION OF SERVER SYSTEMS THAT ARE SCALABLE AND VERSION INDEPENDENT

BACKGROUND OF THE INVENTION

1. Field of the Invention

The present invention relates to systems and methods used for maintaining and managing software programs known as server systems or "servers" in a distributed computing environment. More particularly, the present invention relates to systems and methods used to receive portions of a network client administration system to administer different versions of disparate server systems including a multitude of software packages without having to correspondingly update the network client administration system.

2. Description of the Related Art

Electronic data networks and their components are well known. Many companies, for example, have at least one computer network, such as a local area network (LAN), which connects the company's computer systems. It is not uncommon for companies to have several elaborate computer networks spanning many locations, possibly internationally. Such computer networks are constructed of cables, servers both physical and logical, routers, etc., with such servers being a critical component in a particular network architecture. Accordingly, the maintenance and administration (version control, administration, etc.) of network servers, web servers, etc., and their software backplanes, are vital to the performance of such electronic data networks.

Varied forms of administrative tools are used to maintain and administer network servers, web servers, etc. and, especially, the software backplanes on which such server systems rely. Usually, an administrative client of some sort resides on a network administrator's data processing system and is used to access and administer a server (network, web, etc.) via an electronic data network (e.g., remote administration, etc.). The administrative client software must be compatible with the versions of server software running on the servers resident in a particular network in order to access and administer the servers. As such, prior administration schemes called for dedicated, version specific administration clients. As a result, version control and maintenance of such software became cumbersome and difficult.

Frequently, servers reside both on internal networks and in external networks, where servers may be only accessible via the Internet or a dedicated line. During the growth of a network, servers may be added, and each new server will most likely have a latest version of a server software package loaded. Therefore, the maintenance and administration of electronic data networks has become even more difficult as servers are replaced, a network grows, etc. For example, a network administrator may maintain a web server, a mail server and a dedicated application server (e.g., an electronic commerce shopping cart server system, etc.). Each server could run a different version of a software package. In order to maintain and administer each server, the network administrator may be required to have three different versions of a client administrator, one for each server (e.g., one administration client each for the web server, the mail server, and the application server).

As such, there exists a problem associated with maintaining compatible versions of network servers and client administration tools on electronic data networks for the maintenance and administration of network servers.

Several proposals have been put forth to address the administration problems mentioned above. However, all such prior proposals have focussed on the notion of creating individual, version-specific client-side administration software packages that are keyed to particular server systems. For example, such prior proposals suggest exhaustively upgrading client-side administrator software so that each client administrator is compatible with a particular version of server software. Unfortunately, there are several problems with this proposed solution. One problem is that the latest version of a client administrator may not be backward compatible with older versions of the server system software, and therefore, an older version of the client-side software might also be necessary to maintain a growing network. Another problem is scalability. For example, a system could not easily scale to include new server products that were developed after the introduction of the client administrator's introduction, and different versions of the same server administration components could not usually coexist peacefully in the runtime environment. And, a third problem is that the configuration management associated with maintaining different versions of software both server and client-side can take up a significant amount of time and resources.

Thus, there exists a need to provide new and improved systems and methods to solve the aforementioned problems associated with maintaining and managing versions of network servers and the like. To be viable, such systems and methods must be implemented without causing significant burdens to network infrastructures or undue increases in infrastructure costs.

SUMMARY OF THE INVENTION

In view of the foregoing comments, the present invention provides new and improved systems and methods for a distributed server administrator that is scalable and version independent.

To solve the aforementioned problems associated with server administration, the present invention provides new and improved systems and methods for facilitating distributed server administration of network server systems that are scalable and version independent. The system and method include and involve a server (for example, a World Wide Web server, an application server such as an e-commerce server, a mail server, a news server, etc.) and a client administrator. The server is configured to store and to serve a software package that corresponds to a server software system of the server. The server is further configured to be accessed by client administrator via an electronic data network, such as the Internet and World Wide Web (WWW). The client administrator is configured to access the server, to receive the software package, and to process the software package to conform to the specifications of the server. Execution of the software package allows the server to be administered by the client administrator without requiring the client administrator to be pre-configured with knowledge of the server.

According to another aspect of the present invention, provided is a distributed server administration system, including a plurality of servers coupled to an electronic data network, such as the Internet and World Wide Web, and a client administrator. The plurality of servers are each configured to store and to serve at least one software package, such as a JAR file, Java applet, etc. The software package corresponds to the server and includes version information and storage location information. The client administrator is configured to access each server in the plurality of servers via the electronic data network, to receive at least one software package from the server accessed, and to execute the software package in conjunction with the server accessed. The execution of the software package allows the corresponding server to be administered by the client administrator via the electronic data network.

And, according to another aspect of the present invention, provided is a method for facilitating a distributed server administration system including the steps of: at a client administrator, selecting and accessing a server via an electronic data network, such as the Internet and World Wide Web, where the server is configured to store and to serve at least one software package, such as a JAR file, Java applet, etc. The software package corresponds to the server and includes version information and storage location information. The method also includes a step of receiving the software package and executing the software package in conjunction with the server, where there software package allows the server to be administered.

BRIEF DESCRIPTION OF THE DRAWING FIGURES

The present invention is described in detail below with regard to the attached drawing figures, of which:

FIG. 2 is an example of a JAR class loader environment manifest file according to a preferred embodiment of the present invention;

DETAILED DESCRIPTION OF THE PREFERRED EMBODIMENTS

Figure 1:
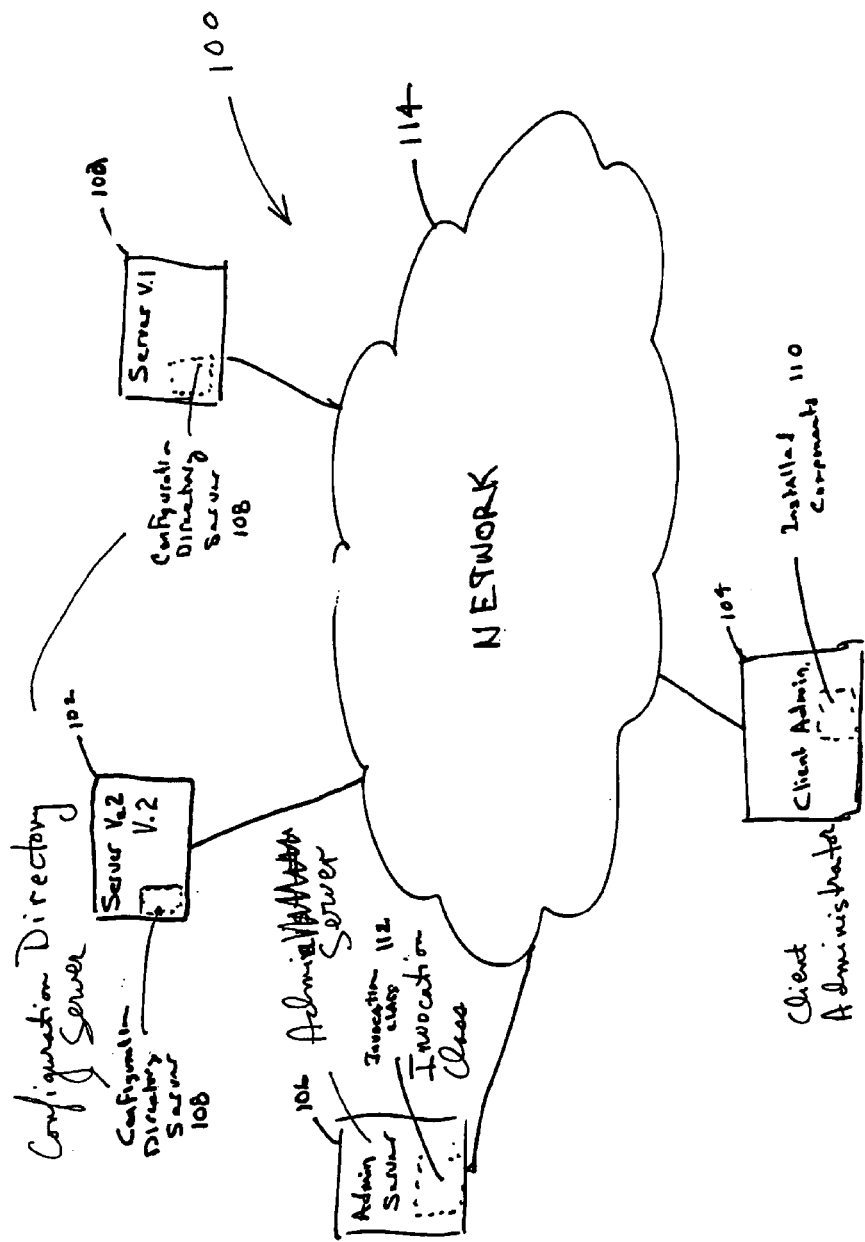
FIG. 1 is a block diagram of a system, which facilitates distributed server administration of servers that is scalable and version independent according to a preferred embodiment of the present invention.

The present invention is now discussed with reference to the drawing figures that were briefly described above. Unless otherwise specified, like parts and processes are referred to with like reference numerals.

To illustrate salient features of the present invention, reference first is made to a system (and corresponding methods) for facilitating distributed server administration of server systems that are scalable and version independent according to a preferred embodiment of the present invention. In particular, referring now to FIG. 1, a system 100 includes server(s) 102 configured to store and serve software packages and to be accessed by a client administrator 104 via a network 114, and an administrative server 106.

Server 102 can be any kind of network server, such as a World Wide Web server system (WWW or "web" server), a LAN server, an application server, a database server, an electronic commerce server, etc. Server systems in the context of the present invention are those systems that are addressable within a network or distributed computing environment and which operate based on a server software package or packages (e.g., a mail server system is one that runs a mail server software package to facilitate electronic mail services, etc.). As shown, multiple servers can be connected to the same network and could each be running different versions of server software (as designated V.1 and V.2). Each server must be maintained and administered (e.g., version controlled, updated, fixed, addressed for performance auditing, etc.). Therefore, a client administrator system 104 is one that is configured to operate within a client-side data processing system (e.g., a client application) and is used to access and administer each server 102 via network 114.

Client administrator 104 is configured to initialize administration by selecting a server to be administered. Selection of the server will determine what version of an administrative interface, or server manager user interface (SMUI), is needed (i.e., the software packages, such as the invocation class and referenced JAR files, to be loaded and executed will correspond to the server software running on the selected server). Selection of the server to be administered could occur from a topological console, shell program, terminal emulator, or other program that is running on the client administrator 104 and is capable of receiving and executing distributed software packages, such as Java archive files (jars), objects, packages, etc. The preferred embodiments of the present invention discussed herein refer to concepts and procedures carried out using a Java or Java-like programming environment. The present invention, however, is not so limited. Many other well-known programming languages and techniques, such as other object oriented programming, could be used.

Once a server is selected for administration, client administrator 104 accesses server 102. Stored on server 102 are reference(s) to an invocation class 112, a reference to a JAR file containing this class (also known as the primary JAR file), and the network address (e.g., uniform resource locator, IP address, etc.) of the JAR file. The network address could be any address accessible via standard protocols, such as, TCP/IP, IP, IPX, etc., and could be located on a separate server, such as administrative server 106, as shown. Each reference could be stored in a common directory on server 102, such as configuration directory server 108 as shown.

Once the client administrator 104 receives the aforementioned references, it analyzes the data in the references. The client administrator 104 is configured to first look locally for the primary JAR file referenced by the server 102. If the primary JAR file is not locally installed, client administrator 104 will access the network address referenced, for example, a network address located on administrative server 106, and retrieve the primary JAR file using a network data transfer protocol, such as HTTP or FTP. Client administrator 104 is capable of installing and storing the primary JAR file locally in a directory, for example, //java/jars. When JAR files are installed locally, the files can be constructed using ISO two-character language code of the current Locale object of the Java virtual machine. For example, in the US Locale, if the primary JAR were named "dirserv40.jar," the localized JAR name would be constructed as "dirserv40_En.jar." If this localized JAR exists, it is downloaded and stored in a JAR directory.

Once the primary JAR file containing the invocation class 112 is located, the class loader environment manifest file can be examined. The class loader environment manifest file can be stored or referenced in the primary JAR file and is used to create the class loader runtime environment for the SMUI. An example of a class loader environment manifest file is shown in FIG. 2.

Referring to FIG. 2, the manifest file 200 contains include directives 202 and 204. Each include directive in manifest file 200 specifies other JAR file(s) whose contents are to be included in the runtime class loader environment of the SMUI. As described above with regard to the primary JAR file, the client administrator 104 can download each JAR file corresponding to include directives 202 and 204; if a JAR file is already locally installed, for instance, in the //java/jars/directory, then the localized JAR file will be used instead of downloading a remotely located JAR file. Otherwise, client administrator 104 will locate the file, either on server 102, administrative server 106 or from another network address if referenced, as previously described.

Otherwise, client administrator 104 will locate the file, either on server 102, admin server 106 or from another network address if referenced, as previously described. Client administrator 104 can instantiate a new custom class loader, referred to herein as the LocalJarClassLoader, and populate its Class Lookup Tables with the contents of the JAR's specified in the include directives of the class loader environment manifest file. Each JAR file corresponding to the include directives, such as include directives 202 and 204, is processed sequentially by the client administrator 104. Each JAR file is decompressed and populated into a hash table. The results are in a reverse-order of precedence for identically named classes found in more than one file. The inclusion of localized JAR files is sequenced so that the localized resources will override any similarly named resources in a non-localized JAR file sharing the same base name. On receipt of a class or resource load request, the LocalJarClassLoader will attempt to fulfill the requests using the contents of the hash table lookup caches. If the request can not be fulfilled, it will be passed to the default system class loader, which uses the CLASSPATH environment variable to resolve requests. Consequently, the contents of the CLASSPATH environment variable are automatically appended to the class loader environment, with respect to load requests.

Client administrator 104 can use the newly created and populated LocalJarClassLoader to load the invocation class, getting the class name from the reference. Effectively, this installs the class loader for use by all class and resource load requests within the scope of the invocation class.

Once the invocation class is loaded, client administrator 104 instantiates the invocation class. The creation of the invocation class launches a SMUI. This will result in a Java User Interface window containing the administration interface for a particular server system product and, in particular, server software package. Note that the resulting server administration interface is running in an isolated and protected process space within a Java virtual machine of the client administrator 104. Therefore, concurrent invocations of server product interfaces can not interfere with one another, and multiple versions of the same server administration interface will not cause conflicts between server administration components.

The present invention is described above in terms of Java programming and, in particular, the use of Java classes and JAR files, and will be immediately understood by one of ordinary skill in the art. However, the invention is not limited as such, and other well known programming techniques and languages can be used to make the invention and will be readily ascertainable to those of ordinary skill in the art.

Figure 3:
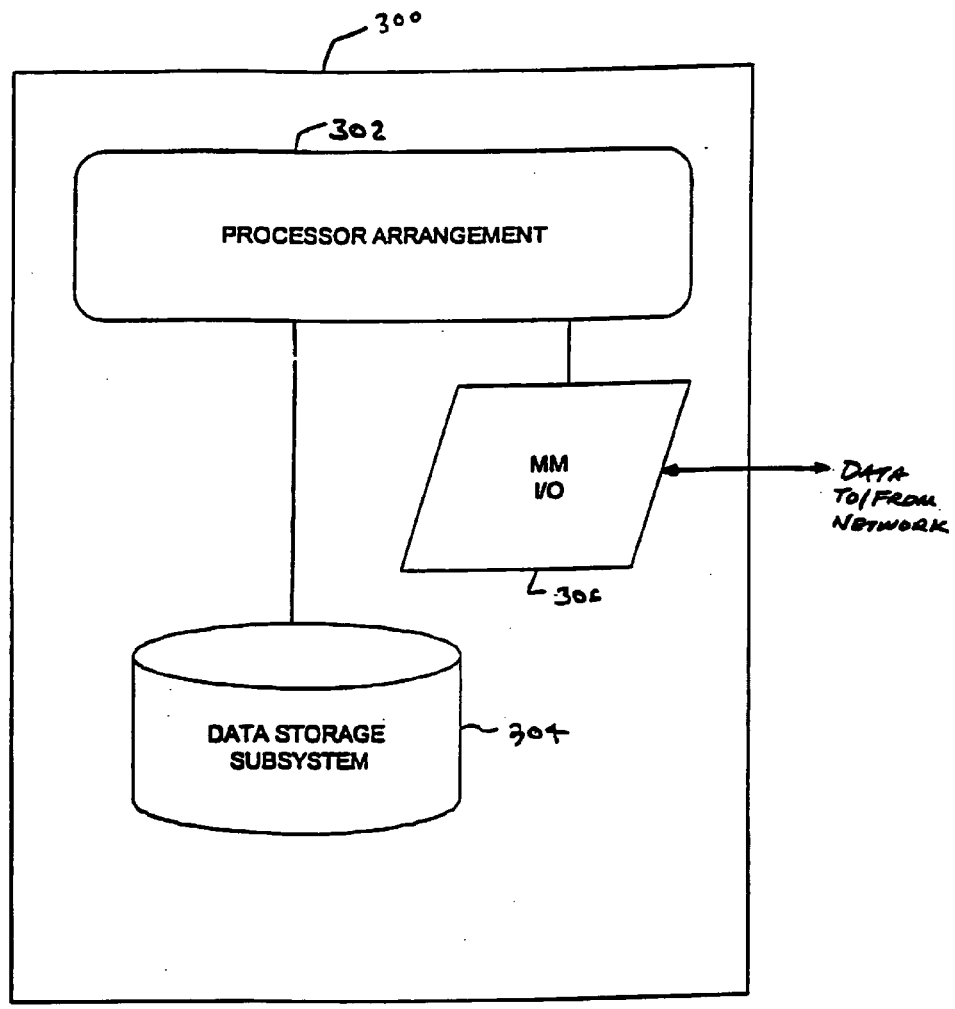
FIG. 3 is a block diagram that illustrates an automatic data processing system (ADP) which may be configured to operate in accordance with the present invention.

Referring now to FIG. 3, therein is depicted block diagram that illustrates an exemplary automatic data processing system (ADP), which may be configured to operate in accordance with the present invention. ADP 300 includes a processor arrangement 302, a data storage subsystem 304, and multimedia input and output device(s) 306. ADP 300 may be configurable to operate as a server 102, as a client administrator 104, and as an administrative server 106. As such, ADP 300 is configurable to store and serve software packages and other computer files (for example, JAR files, Java class references, etc.), such: as those stored and served by configuration directory server 108, and to execute a server software package (for example, as designated by V.1 and V.2, as shown in FIG. 1). ADP 300 is also configurable to access a network address, download, install and process JAR files, as described in reference to client administrator 104 and FIG. 1. The arrangement and configuration of ADP 300 to operate as a server 102, as a client administrator 104, and as an administrative server 106 will be immediately understood by those skilled in the art after reviewing the present invention and this patent document.

Figure 4:
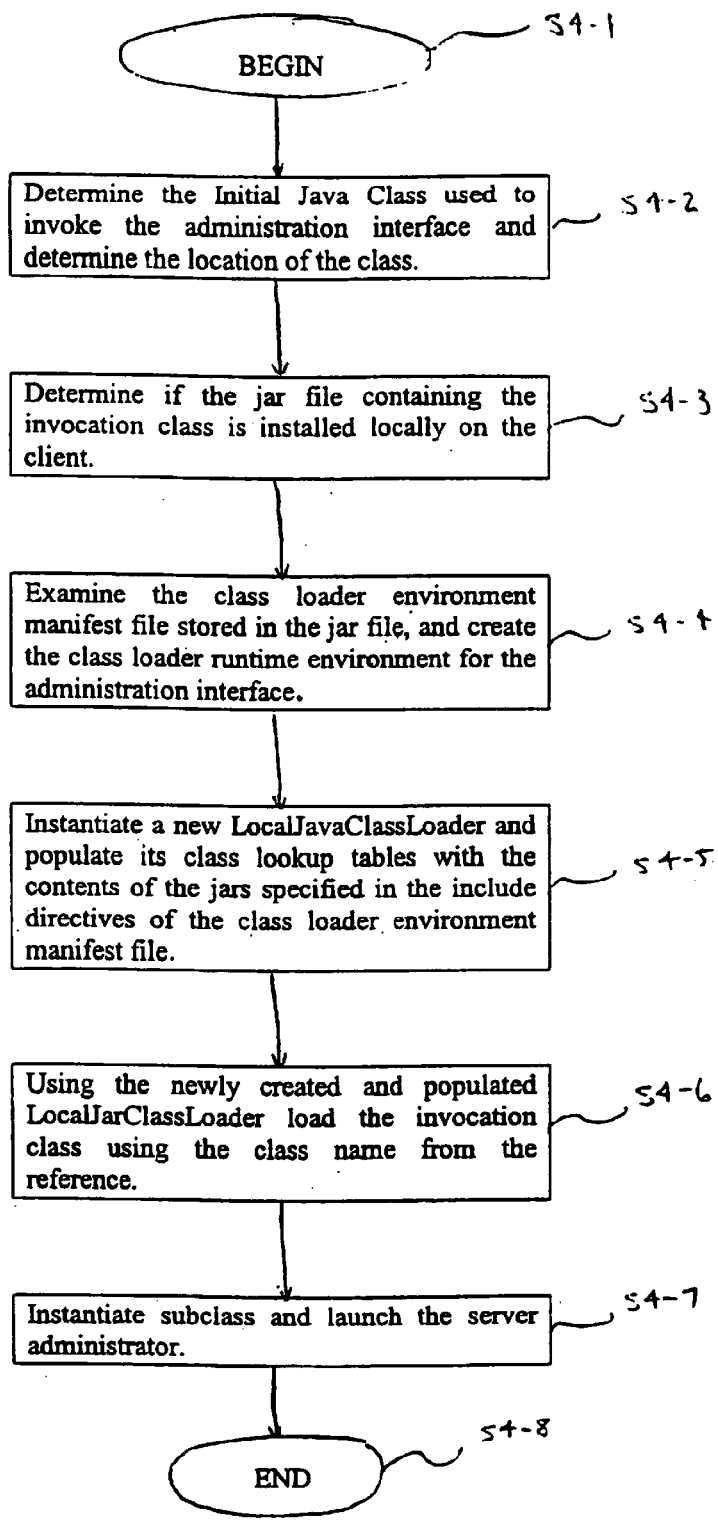
FIG. 4 is a flowchart that illustrates a method, which may be used to facilitate distributed server administration in accordance with a preferred embodiment of the present invention.

Referring now to FIG. 4, depicted therein is a flowchart that illustrates a method for distributing a server administrator software system across a network so that it is scalable and version independent according to a preferred embodiment of the present invention. Processing and operations begin at step S4-1 and immediately proceed to step S4-2.

At step S4-2, the initial Java class used to invoke an administration interface, or SMUI, and the location of the class must be determined. First, a server to be administered, such as server facility 102, is selected to initialize programming. Selection of the server will determine what version of an SMUI is needed (i.e., the software packages, such as the invocation class and referenced JAR files, to be loaded and executed will correspond to the server software running on the selected server). This can be done from a client administrator, such as client administrator 104 described in reference to FIG. 1 that is connected or otherwise coupled to a network, such as network 114, and capable of accessing the server to be selected via the network. As described above, the network may be any computer or communications network, such as the Internet and World Wide Web, an intranet, Ethernet, etc. As described above in reference to FIG. 1, the server should contain references to the invocation class, the JAR file containing the invocation class (primary JAR file), and the location of the JAR file. The primary JAR file can be located at a specific network address, such as an IP address, and/or may be located on a specific server, such as server 102 or administrative server 106 described in reference to FIG. 1. The references could also be stored on the server in a common directory, such as described above with reference to FIG. 1.

Once the invocation class and its location are determined, processing proceeds to step S4-3. At step S4-3, it is determined whether a local installation of the JAR file containing the invocation class (primary JAR file) exists. If one does not exist, then the primary JAR file must be downloaded from its location, i.e., from the referenced network address, server or admin server. As described in reference to client administrator 104 and FIG. 1, locally installed JAR files could be placed in a common directory, such as a //java/jars/directory. If the JAR file is not loaded locally, the file can be downloaded and installed locally via HTTP, or other well known data transfer techniques and protocols, and can be stored in a common directory. Upon completion of the download, an attempt is made to download a localization JAR file containing the localized resources of the JAR file previously loaded. The localization JAR files can be constructed using ISO two-character language code of the current Locale object of the java virtual machine. For example, in the US Locale, if the primary JAR file were named "dirserv40.jar," then the localized JAR name would be constructed as "dirserv40_En.jar." If this localized JAR file exists, it is downloaded and stored in the jars directory.

After the JAR file containing the invocation class is loaded locally, processing proceeds next to step S44. At step S44, the class loader environment manifest file stored in the primary JAR file is examined, and the class loader runtime environment for the SMUI is created. An example of this file is shown in FIG. 2 and has already been described above.

Each include directive in the class loader environment manifest file specifies JAR file(s) whose contents are to be included in the runtime class loader environment of the SMUI. As described above with regard to the primary JAR file, at least one JAR file corresponding to each include directive, such as include directives 202 and 204, is downloaded; if a JAR file is already locally installed, for instance, in the //java/jars/directory, then the localized version will be used instead. As described above with reference to FIGS. 1 and 2, a client administrator, such as client administrator 104, may be used to perform this step. Next, processing proceeds to step S4-5.

At step S4-5, a new custom class loader, referred to herein as the LocalJarClassLoader, is created referencing the classes needed by the SMUI. Therefore, LocalJarClassLoader is instantiated, and its Class Lookup Tables are populated with the contents of the JAR files specified in the include directives of the class loader environment manifest file. Each JAR file corresponding to the include directives is processed sequentially. Each JAR file is decompressed and populated into a hash table. The results are in a reverse-order of precedence for identically named classes found in more than one file. The inclusion of localized JAR files is sequenced so that the localized resources will override any similarly named resources in a non-localized JAR file sharing the same base name. On receipt of a class or resource load request, the LocalJarClassLoader will attempt to fulfill the requests using the contents of the hash table lookup caches. If the request cannot be fulfilled, it will be passed to the default system class loader, which uses the CLASSPATH environment variable to resolve requests. Consequently, the contents of the CLASSPATH environment variable are automatically appended to the class loader environment, with respect to load requests. Next, processing proceeds to step S4-6.

At step S4-6, the invocation class is loaded using the newly created and populated LocalJarClassLoader and the reference from step S4-2. Effectively, this installs the class loader for use by all class and resource load requests within the scope of the invocation class. Processing proceeds next to step S4-7.

At step S4-7, the invocation class is instantiated. The creation of the invocation class is expected to launch the SMUI. This will result in a Java User Interface window containing the administration interface for the particular server being maintained. Note that the resulting server administration interface is running in an isolated and protected process space within the Java virtual machine of the client administrator. Therefore, concurrent invocations of server product interfaces can not interfere with one another, and multiple versions of the same server administration interface will not cause conflicts between server administration components.

Once the Java SMUI is launched, the server selected may be administered. As described, the above method facilitates distributing a server administrator across a network at the time of need, such as during runtime of a client application intended to administer a server for the first time and, possibly, without pre-configured knowledge of the existence of a particular server within a network environment. References and files may be bundled with a server system in the described fashion, or files may be stored and served separately while only references are bundled with a server system, thus producing a scalable, version independent client administrator for servers that may be changed, upgraded or otherwise maintained on varied schedules.

Thus, having fully described the present invention by way of example with reference to the attached drawing figures, it will be readily appreciated that many changes and modifications may be made to the invention and to any of the exemplary embodiments shown and/or described herein without departing from the spirit or scope of the invention which is defined in the appended claims.

What is claimed is:

1. A distributed server administration system, comprising:
   a first server configured to be accessed via an electronic data network and to store and serve a first version of at least one first software package via said electronic data network, wherein said first version of said at least one first software package corresponds to at least one software system of said first server;
   a second server configured to be accessed via said electronic data network and to store and serve a second version of said at least one first software package via said electronic data network, wherein said second version of said at least one first software package is different than said first version of said at least one first software package and corresponds to at least one software system of said second server; and
   a client administrator configured to access each of said-first server and said second server, to receive each of said first version of said at least one first software package and said second version of said at least one first software package, and to execute each of said first version of said at least one first software package and said second version of said at least one first software package, the execution of said first version of said at least one first software package allowing said first server to be administered by said client administrator via said electronic data network, and the execution of said second version of said at least one first software package allowing said second server to be administered by said client administrator via said electronic data network.

2. The system according to claim 1, wherein said client administrator is further configured to install and store said at least one first software package.

3. The system according to claim 1, wherein said at least one first software package is a JAR file.

4. A method for facilitating a distributed server administration system comprising the steps of:
   at a client administrator, selecting and accessing a first server to be administered via an electronic data network, said first server configured to store and to serve a first version of at least one first software package corresponding to said first server;
   at a client administrator, selecting and accessing a second server to be administered via said electronic data network, said second server configured to store and to serve a second version of said at least one first software package corresponding to said second server;
   at said client administrator, receiving each of said first version and said second version of said at least one first software package; and
   at said client administrator, executing each of said first version and said second version of said at least one first software package, the execution of said first version of said at least one first software package allowing said first server to be administered by said client administrator via said electronic data network, and the execution of said second version of said at least one first software package allowing said second server to be administered by said client administrator via said electronic data network.

5. The method according to claim 4, wherein said at least one first software package is a JAR file.

6. The method according to claim 4, wherein said client administrator is further configured to install and store said at least one first software package.

* * * * *